(12) United States Patent
Kim et al.

(10) Patent No.: US 7,345,715 B2
(45) Date of Patent: Mar. 18, 2008

(54) APPARATUS AND METHOD FOR TRANSMITTING AND RECEIVING MULTIPLE SIGNALS INCLUSIVELY

(75) Inventors: Hee-seung Kim, Suwon-si (KR); Hyun-koo Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 514 days.

(21) Appl. No.: 10/968,362

(22) Filed: Oct. 20, 2004

(65) Prior Publication Data

US 2005/0195328 A1 Sep. 8, 2005

(30) Foreign Application Priority Data

Oct. 21, 2003 (KR) .................... 10-2003-0073416

(51) Int. Cl.
  *H04N 5/40* (2006.01)
  *H04N 5/455* (2006.01)
(52) U.S. Cl. ..................... 348/724; 348/726
(58) Field of Classification Search ........ 348/723–726, 348/487, 486; 375/295, 301, 315, 316, 321, 375/324; 455/47, 91, 104, 109, 130, 203; *H04N 7/12, H04N 7/00, 5/38, 5/40, 5/44, 5/455*
See application file for complete search history.

(56) References Cited

U.S. PATENT DOCUMENTS 5,585,850 A 12/1996 Schwaller 6,559,898 B1 * 5/2003 Citta et al. .................. 348/723
6,680,971 B1 * 1/2004 Tazebay et al. ............. 348/726

FOREIGN PATENT DOCUMENTS

| JP | 09-261611 A | 10/1997 |
|----|-------------|---------|
| KR | 2001-0063823 A | 7/2001 |
| KR | 2003-0027467 A | 4/2003 |
| KR | 2003-0046733 A | 6/2003 |

* cited by examiner

*Primary Examiner*—Sherrie Hsia
(74) *Attorney, Agent, or Firm*—Sughrue Mion, PLLC

(57) ABSTRACT

An apparatus and method for transmitting and receiving multiple signals inclusively in one channel are provided. The apparatus for transmitting multiple signals inclusively includes a single-sideband signal synthesis unit which synthesizes single-sideband signals having predetermined bands to generate an inclusive single-sideband signal which includes the bands of the single-sideband signals; a main modulation unit which modulates an inclusive single-sideband signal with a primary carrier frequency to generate an inclusive double-sideband signal where the primary carrier frequency is the center frequency; a main band pass filter which allows only any one single-sideband signal of an inclusive double-sideband signal to generate an inclusive single-sideband signal where a primary carrier frequency is an edge frequency of the inclusive band; and an inclusive single-sideband signal transmission unit which transmits an inclusive single-sideband signal. By transmitting and receiving multiple signals inclusively in one channel, the apparatus can efficiently process transmission and reception of multiple signals.

21 Claims, 10 Drawing Sheets

APPARATUS AND METHOD FOR TRANSMITTING AND RECEIVING MULTIPLE SIGNALS INCLUSIVELY

This application claims is based on and claims priority from Korean Patent Application No. 2003-73416, filed on Oct. 21, 2003, in the Korean Intellectual Property Office, the disclosure of which is incorporated herein in its entirety by reference.

BACKGROUND OF THE INVENTION

1. Field of the Invention

The present invention relates to an apparatus and method for transmitting and receiving multiple signals inclusively via one channel.

2. Description of the Related Art

With the introduction of high definition (HD) broadcasting, the size of a digital TV has been increasing. Accordingly, many restrictions on the space where a digital TV can be placed have appeared. When the broadcasting receiving environment of a house is considered, a place near to the outside without obstacles has an idealistic broadcasting reception environment. In the prior art, a digital TV could be installed only in a wide space such that there has been difficulties to secure an idealistic radio reception environment. In addition, a digital TV should be installed in an environment capable of receiving radio waves such that utilization of a space is very low.

SUMMARY OF THE INVENTION

An apparatus and method for transmitting and receiving multiple signals inclusively in one channel are provided.

According to an exemplary embodiment of the present invention, there is provided an apparatus for transmitting multiple signals inclusively comprising: a single-sideband signal synthesis unit which synthesizes single-sideband signals having a predetermined band to generate an inclusive single-sideband signal which includes the bands of the single-sideband signals; a main modulation unit which modulates the inclusive single-sideband signal generated in the single-sideband signal synthesis unit, with a primary carrier frequency to generate an inclusive double-sideband signal where the primary carrier frequency is the center frequency; a main band pass filter which allows only any one single-sideband signal of the inclusive double-sideband signal generated in the main modulation unit, to generate an inclusive single-sideband signal where the primary carrier frequency is an edge frequency of the inclusive band; and an inclusive single-sideband signal transmission unit which transmits the inclusive single-sideband signal generated in the main band pass filter.

According to another exemplary embodiment of the present invention, there is provided an apparatus for receiving multiple signals inclusively comprising: an inclusive single-sideband signal reception unit which receives an inclusive single-sideband signal having an inclusive band including bands of single-sideband signals having a predetermined band; a main demodulation unit which modulates the inclusive single-sideband signal received by the inclusive single-sideband signal reception unit, with a primary carrier frequency that is an edge frequency of the inclusive band, to generate an inclusive double-sideband signal where the primary carrier frequency is the center frequency; and a main band pass filter which allows only the inclusive band from a first frequency of the inclusive double-sideband signal generated in the main demodulation unit, to pass through, to generate an inclusive single-sideband signal where the first frequency is an edge frequency of the inclusive band.

According to still another exemplary embodiment of the present invention, there is provided an apparatus for transmitting and receiving multiple signals inclusively comprising: an apparatus for transmitting multiple signals inclusively which synthesizes single-sideband signals having a predetermined band, to generate an inclusive single-sideband signal including the bands of the single-sideband signals, modulates the generated inclusive single-sideband signal with a primary carrier frequency, to generate an inclusive double-sideband signal where the primary carrier frequency is the center frequency, allows only any one single-sideband signal of the generated double-sideband signal to pass through, to generate an inclusive single-sideband signal where the primary carrier frequency is an edge frequency of the inclusive band, and transmits the generated inclusive single-sideband signal; and an apparatus for receiving multiple signals inclusively which receives the inclusive single-sideband signal transmitted by the apparatus for transmitting multiple signals inclusively, modulates the received inclusive single-sideband signal with a primary carrier frequency that is an edge frequency of the inclusive band, to generate an inclusive double-sideband signal where the primary carrier frequency is the center frequency, allows only the inclusive band from a first frequency of the generated inclusive double-sideband signal to pass through, to generate an inclusive single-sideband signal where the first frequency is an edge frequency of the inclusive band.

According to yet still another exemplary embodiment of the present invention, there is provided a method for transmitting multiple signals inclusively comprising: synthesizing single-sideband signals having a predetermined band to generate an inclusive single-sideband signal which includes the bands of the single-sideband signals; modulating the generated inclusive single-sideband signal with a primary carrier frequency to generate an inclusive double-sideband signal where the primary carrier frequency is the center frequency; allowing only any one single-sideband signal of the generated inclusive double-sideband signal, to generate an inclusive single-sideband signal where the primary carrier frequency is an edge frequency of the inclusive band; and transmitting the generated inclusive single-sideband signal.

According to a further exemplary embodiment of the present invention, there is provided a method for receiving multiple signals inclusively comprising: receiving an inclusive single-sideband signal having an inclusive band including bands of single-sideband signals having a predetermined band; modulating the received inclusive single-sideband signal with a primary carrier frequency that is an edge frequency of the inclusive band, to generate an inclusive double-sideband signal where the primary carrier frequency is the center frequency; and allowing only the inclusive band from a first frequency of the generated inclusive double-sideband signal to pass through, to generate an inclusive single-sideband signal where the first frequency is an edge frequency of the inclusive band.

According to an additional exemplary embodiment of the present invention, there is provided a method for transmitting and receiving multiple signals inclusively comprising: synthesizing single-sideband signals having a predetermined band, to generate an inclusive single-sideband signal including the bands of the single-sideband signals, modulating the generated inclusive single-sideband signal with a primary carrier frequency, to generate an inclusive double-sideband signal where the primary carrier frequency is the center frequency, allowing only any one single-sideband signal of the generated double-sideband signal to pass through, to generate an inclusive single-sideband signal where the primary carrier frequency is an edge frequency of the inclusive band, and transmitting the generated inclusive single-sideband signal; and receiving the inclusive single-sideband signal transmitted by the apparatus for transmitting multiple signals inclusively, modulating the received inclusive single-sideband signal with a primary carrier frequency that is an edge frequency of the inclusive band, to generate an inclusive double-sideband signal where the primary carrier frequency is the center frequency, allowing only the inclusive band from a first frequency of the generated inclusive double-sideband signal to pass through, to generate an inclusive single-sideband signal where the first frequency is an edge frequency of the inclusive band.

According to an additional exemplary embodiment of the present invention, there is provided a computer readable recording medium having embodied thereon a program for a method for transmitting multiple signals inclusively.

According to an additional exemplary embodiment of the present invention, there is provided a computer readable recording medium having embodied thereon a program for a method for receiving multiple signals inclusively.

According to an additional exemplary embodiment of the present invention, there is provided a computer readable recording medium having embodied thereon a program for a method for transmitting and receiving multiple signals inclusively.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

The present invention will now be described more fully with reference to the accompanying drawings, in which exemplary embodiments of the invention are shown.

Figure 1:
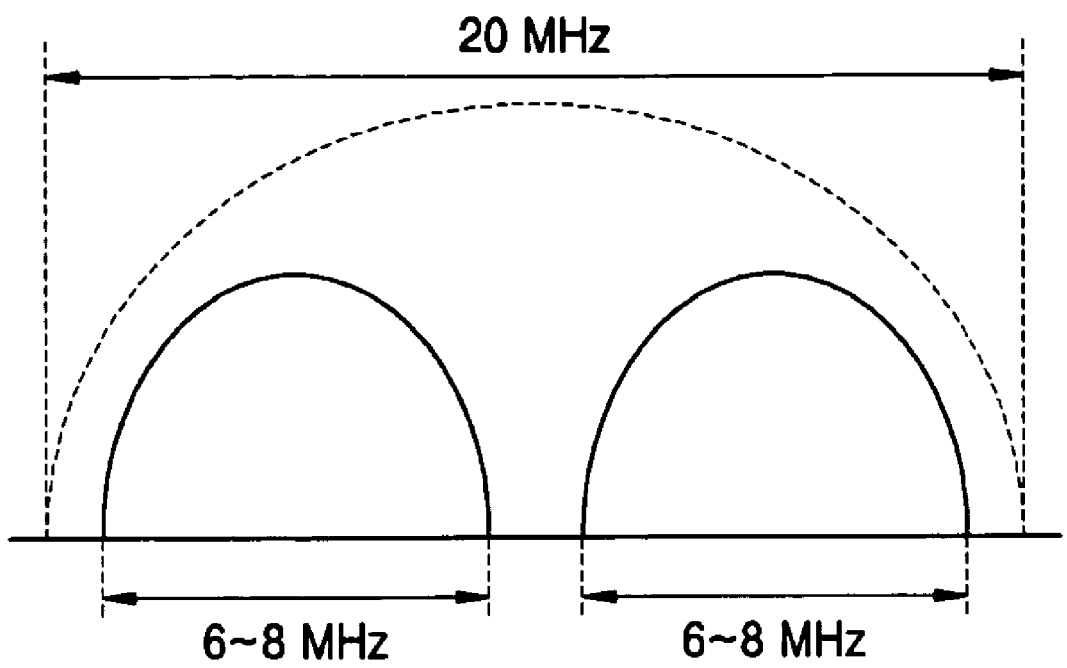
FIG. 1 is a diagram showing an inclusive band according to an exemplary embodiment of the present invention.

Referring to FIG. 1, it can be seen that an inclusive band is a band including two bands.

An analog TV broadcast signal and a digital TV broadcast signal have a band of 6 MHz~8 MHz for one channel irrespective of ground waves and cables.

In the case of digital TV broadcasting, the Advanced Television System Committee (ATSC) standard, adopted by Korea and the U.S., uses a 6 MHz band for transmitting a broadcast signal, while digital video broadcasting-terrestrial (DVB-T) standard, adopted by European countries, uses an 8 MHz band for transmitting a broadcast signal. Also, the IEEE 802.11a/b standard which is the standard for communications between wireless terminals uses a 20 MHz band for transmitting wireless LAN signal.

Here, the 20 MHz band of the IEEE 802.11a/b standard can include up to three 6 MHz bands of the ATSC standard, and up to two 8 MHz bands of the DVB-T standard. Accordingly, it can be known that by using wireless terminals complying with the IEEE 802.11a/b standard, two to three channels of digital TV signals can be transmitted and received at the same time.

Figure 2:
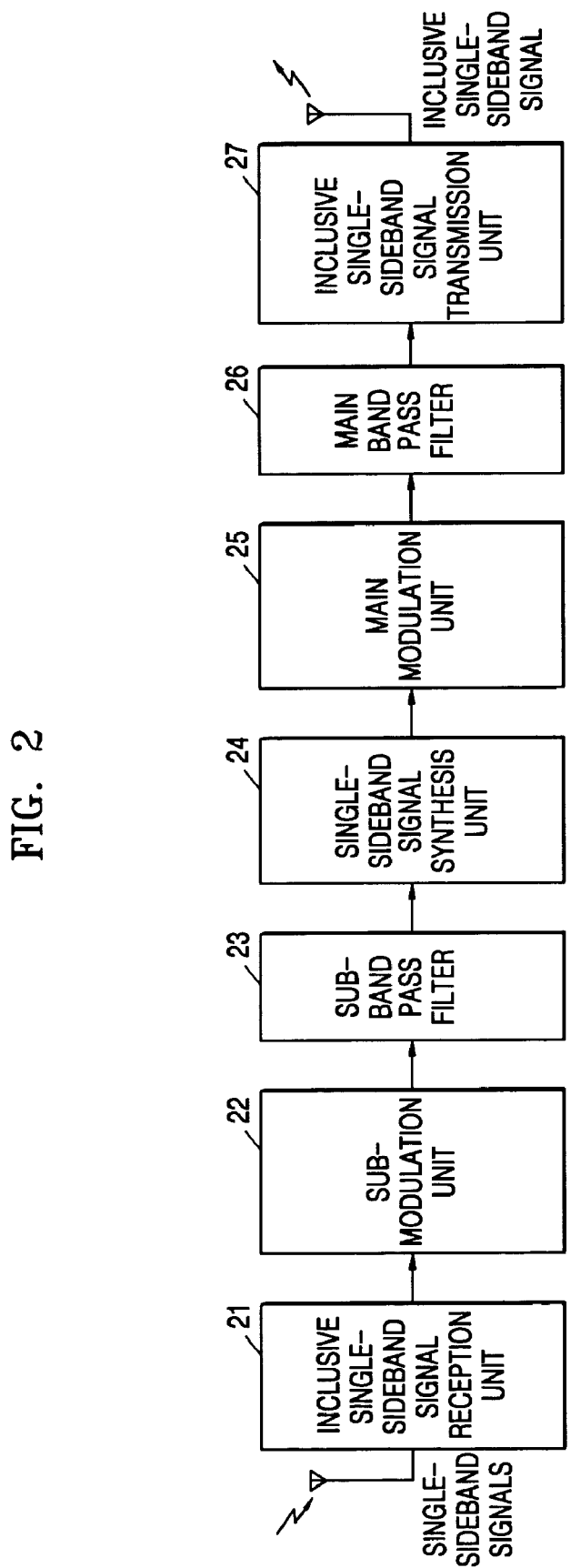
FIG. 2 is a diagram of the structure of an apparatus for transmitting multiple signals inclusively according to an exemplary embodiment of the present invention.

FIG. 2 is a diagram of the structure of an apparatus for transmitting multiple signals inclusively according to an exemplary embodiment of the present invention.

Referring to FIG. 2, the apparatus for transmitting multiple signals inclusively comprises a single-sideband signal reception unit 21, a sub-modulation unit 22, a sub-band pass filter 23, a single-sideband signal synthesis unit 24, a main modulation unit 25, a main band pass filter 26, and an inclusive single-sideband signal transmission unit 27.

The single-sideband signal reception unit 21 receives single-sideband signals having a predetermined band. If a signal is modulated with a carrier frequency, in the frequency spectrum of the modulated signal, the spectrum of the original signal is kept in sidebands of both upper side and lower side centering on the carrier frequency. A method transmitting this without change is referred to as double-sideband transmission, while a method transmitting only any one of the upper sideband and the lower sideband is referred to as single-sideband transmission. At present, analog TV signals and digital TV signals use the single-sideband transmission. In particular, since most of any one of a sideband is removed and the remaining part and the other side complete sideband are transmitted, it is referred to as vestigial sideband transmission. A single-sideband in the present invention includes a vestigial sideband. The single-sideband signal reception unit 21 receives the same number of single-sideband signals as can be included in an inclusive band. For example, if a band is 5 MHz and an inclusive band is 24 MHz, four single-sideband signals can be received at once.

The sub-modulation unit 22 modulates the single-sideband signals received by the single-sideband signal reception unit 21 with sub-carrier frequencies divided by intervals greater than the bands of the received single-sideband signals, to generate double-sideband signals where the sub-carrier frequencies are center frequencies. In the above example, since the interval of the sub-carrier frequencies should be equal to or greater than 5 MHz and the number of single-sideband signals received at once is four, the sub-carrier frequencies should be 6 MHz, 12 MHz, 18 MHz, and 24 MHz, respectively. If modulation with these sub-carrier frequencies is performed, four double-sideband signals, including a double-sideband signal where a 6 MHz frequency is the center frequency, a double-sideband signal where a 12 MHz frequency is the center frequency, a double-sideband signal where a 18 MHz frequency is the center frequency, and a double-sideband signal where a 24 MHz frequency is the center frequency, are generated.

The sub-band pass filter 23 allows only one single-sideband signal of the double-sideband signals generated in the sub-modulation unit, to pass through, to generate single-sideband signals where the sub-carrier frequencies are edge frequencies of the bands. In the above example, four single-sideband signals, including a single-sideband signal where the 6 MHz frequency is an edge frequency of the band, a single-sideband signal where the 12 MHz frequency is an edge frequency of the band, a single-sideband signal where the 18 MHz frequency is an edge frequency of the band, and a single-sideband signal where the 24 MHz frequency is an edge frequency of the band, are generated.

The single-sideband signal synthesis unit 24 synthesizes single-sideband signals generated in the sub-band pass filter 23, to generate an inclusive single-sideband signal having an inclusive band including the bands of the single-sideband signals. In the above example, by synthesizing the single-sideband signal where the 6 MHz frequency is an edge frequency of the band, the single-sideband signal where the 12 MHz frequency is an edge frequency of the band, the single-sideband signal where the 18 MHz frequency is an edge frequency of the band, and the single-sideband signal where the 24 MHz frequency is an edge frequency of the band, an inclusive single-sideband signal having a 24 MHz inclusive band is generated.

The main modulation unit 25 modulates the inclusive single-sideband signal generated in the single-sideband signal synthesis unit 24, with a primary carrier frequency, to generate an inclusive double-sideband signal where the primary carrier frequency is the center frequency. In the above example, if the primary carrier frequency is 1 GHz, the main modulation unit 25 generate an inclusive double-sideband signal which comprises an inclusive single-sideband, including a single-sideband signal where a (1 GHz+6 MHz) frequency is an edge frequency of the band, a single-sideband signal where a (1 GHz+12 MHz) frequency is an edge frequency of the band, a single-sideband signal where a (1 GHz+18 MHz) frequency is an edge frequency of the band, and a single-sideband signal where a (1 GHz+24 MHz) frequency is an edge frequency of the band, as the upper sideband signal, and an inclusive single-sideband, including a single-sideband signal where a (1 GHz−6 MHz) frequency is an edge frequency of the band, a single-sideband signal where a (1 GHz−12 MHz) frequency is an edge frequency of the band, a single-sideband signal where a (1 GHz−18 MHz) frequency is an edge frequency of the band, and a single-sideband signal where a (1 GHz−24 MHz) frequency is an edge frequency of the band, as the lower sideband signal.

The main band pass filter 26 allows only any one single-sideband signal of the inclusive double-sideband signal generated in the main modulation unit 25, to pass through to generate an inclusive single-sideband signal where the primary carrier frequency is an edge frequency of the inclusive band. In the above example, only one of the upper sideband signal and the lower sideband signal is allowed to pass through and an inclusive single-sideband signal where 1 GHz is an edge frequency of the 24 MHz inclusive band is generated.

The inclusive single-sideband signal transmission unit 27 transmits the inclusive single-sideband signal generated in the main band pass filter 26.

Figure 3:
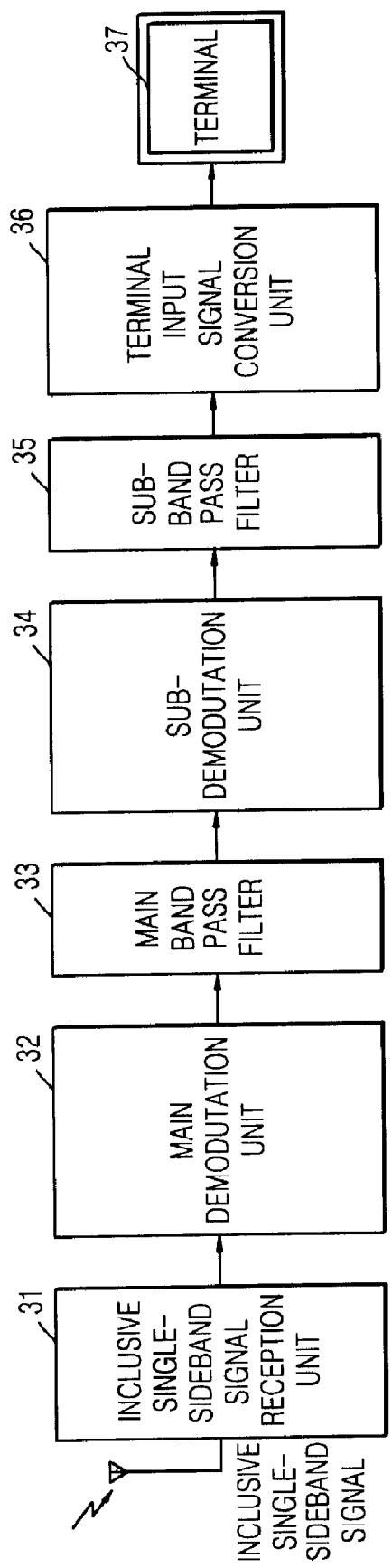
FIG. 3 is a diagram of the structure of an apparatus for receiving multiple signals inclusively according to an exemplary embodiment of the present invention.

FIG. 3 is a diagram of the structure of an apparatus for receiving multiple signals inclusively according to an exemplary embodiment of the present invention.

Referring to FIG. 3, the apparatus for receiving multiple signals inclusively comprises an inclusive single-sideband signal reception unit 31, a main demodulation unit 32, a main band pass filter 33, a sub-demodulation unit 34, a sub-band pass filter 35, and a terminal input signal conversion unit 36.

The inclusive single-sideband signal reception unit 31 receives an inclusive single-sideband signal having an inclusive band including the bands of single-sideband signals having a predetermined band. In the above example, the inclusive single-sideband signal where 1 GHz is an edge frequency of the 24 MHz inclusive band is received.

The main demodulation unit 32 modulates the inclusive single-sideband signal received by the inclusive single-sideband signal reception unit 31, with the primary carrier frequency that is an edge frequency of the inclusive band, to generate an inclusive double-sideband signal where the primary carrier frequency is the center frequency. A frequency containing practical information such as voice and image information is a very low baseband frequency. Since the baseband frequencies of voice and images are similar to each other, if these frequencies are transmitted without change, they overlap each other such that the original signals cannot be distinguished when the frequencies are received. Accordingly, in order to transmit and receive voice and image signals, frequencies should be raised. The frequency used at this time is referred to as a carrier frequency. If a signal modulated with a carrier frequency is modulated again with the same carrier frequency, a signal having the original baseband frequency is generated. The main demodulation unit 32 uses this characteristic. In the above example, an inclusive double-sideband signal where 1 GHz is the center frequency is generated. The generated double-sideband signal contains an inclusive single-sideband signal having a baseband frequency.

The main band pass filter 33 allows only the inclusive band from a first frequency of the inclusive double-sideband signal generated in the main demodulation unit 32, to pass through, to generate an inclusive single-sideband signal where the first frequency is an edge frequency of the inclusive band. That is, the main band pass filter 33 allows only the inclusive single-sideband signal corresponding to the baseband in the inclusive double-sideband signal generated in the main demodulation unit 32, to pass through. Here, the first frequency is the start frequency of the baseband. In the above example, the main band filter 33 allows only the inclusive single-sideband signal corresponding to the baseband in the double-sideband signal where 1 GHz is the center frequency, to pass through.

The sub-demodulation unit 34 modulates the inclusive single-sideband signal generated in the main band pass filter 33, with sub-carrier frequencies which are edge frequencies of the bands of single-sideband signals, to generate inclusive double-sideband signals where sub-carrier frequencies are center frequencies. In the above example, the inclusive single-sideband signal corresponding to the baseband is modulated with sub-carrier frequencies, 6 MHz, 12 MHz, 18 MHz, and 24 MHz, respectively. If the signal is modulated with these sub-carrier frequencies, four inclusive double-sideband signals, including an inclusive double-sideband signal where a 6 MHz frequency is the center frequency, an inclusive double-sideband signal where a 12 MHz frequency is the center frequency, an inclusive double-sideband signal where a 18 MHz frequency is the center frequency, and an inclusive double-sideband signal where a 24 MHz frequency is the center frequency, are generated. As in the primary carrier frequency, since the sub-carrier frequency identical to that used in the transmission is used for the modulation, a single-sideband signal having the original baseband frequency is generated. The four inclusive double-sideband signals generated in the sub-demodulation unit 34 includes four respective original single-sideband signals.

The sub-band pass filter 35 allows the bands from a second frequency of the inclusive double-sideband signals generated in the sub-demodulation unit 34, to pass through, to generate single-sideband signals where the second frequency is edge frequencies of the bands. That is, in each of the inclusive double-sideband signals generated in the sub-demodulation unit 34, only the single-sideband signal corresponding to the baseband is allowed to pass through. Here, the second frequency is the start frequency of the baseband. In the above example, in the four inclusive double-sideband signals generated in the sub-demodulation unit 34, only the four original single-sideband signals corresponding to basebands are allowed to pass through.

The terminal input signal conversion unit 36 converts the single-sideband signals generated in the sub-band pass filter 35, into an input signal for a predetermined terminal. There is a unique format of an input signal for each terminal. The terminal input signal conversion unit 36 converts the formats of the single-sideband signals generated in the sub-band pass filter 35, into the formats of input signals appropriate to respective terminals.

Referring to FIGS. 2 and 3, the apparatus for transmitting and receiving multiple signals inclusively according to an exemplary embodiment of the present invention comprises the apparatus for transmitting multiple signals inclusively (FIG. 2) and the apparatus for receiving multiple signals inclusively (FIG. 3).

The apparatus for transmitting multiple signals inclusively (FIG. 2) synthesizes single-sideband signals having a predetermined band, to generate an inclusive single-sideband signal including the bands of the single-sideband signals, modulates the generated inclusive single-sideband signal with a primary carrier frequency, to generate an inclusive double-sideband signal where the primary carrier frequency is the center frequency, allows only any one single-sideband signal of the generated double-sideband signal to pass through, to generate an inclusive single-sideband signal where the primary carrier frequency is an edge frequency of the inclusive band, and transmits the generated inclusive single-sideband signal.

The apparatus for receiving multiple signals inclusively (FIG. 3) receives the inclusive single-sideband signal transmitted by the apparatus for transmitting multiple signals inclusively (FIG. 2), modulates the received inclusive single-sideband signal with a primary carrier frequency that is an edge frequency of the inclusive band, to generate an inclusive double-sideband signal where the primary carrier frequency is the center frequency, allows only the inclusive band from a first frequency of the generated inclusive double-sideband signal to pass through, to generate an inclusive single-sideband signal where the first frequency is an edge frequency of the inclusive band.

Figure 4:
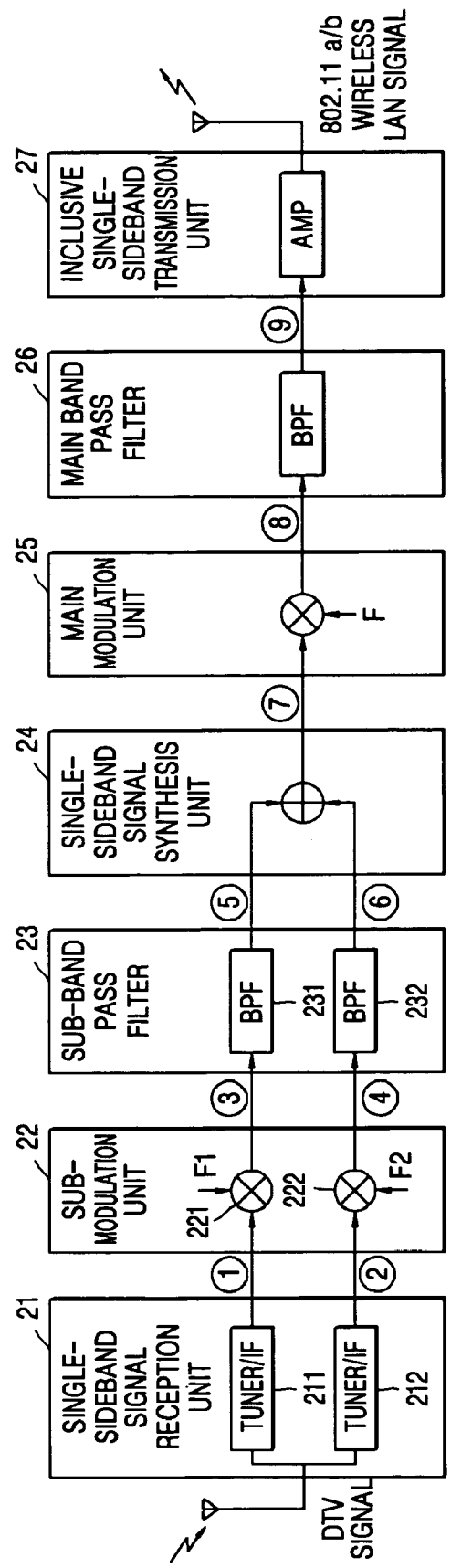
FIG. 4 is a diagram of the apparatus for transmitting multiple signals inclusively of FIG. 2 applied to a digital TV standard and wireless LAN standard.

FIG. 4 is a diagram of the apparatus for transmitting multiple signals inclusively of FIG. 2 applied to a digital TV standard and wireless LAN standard.

Figure 5:
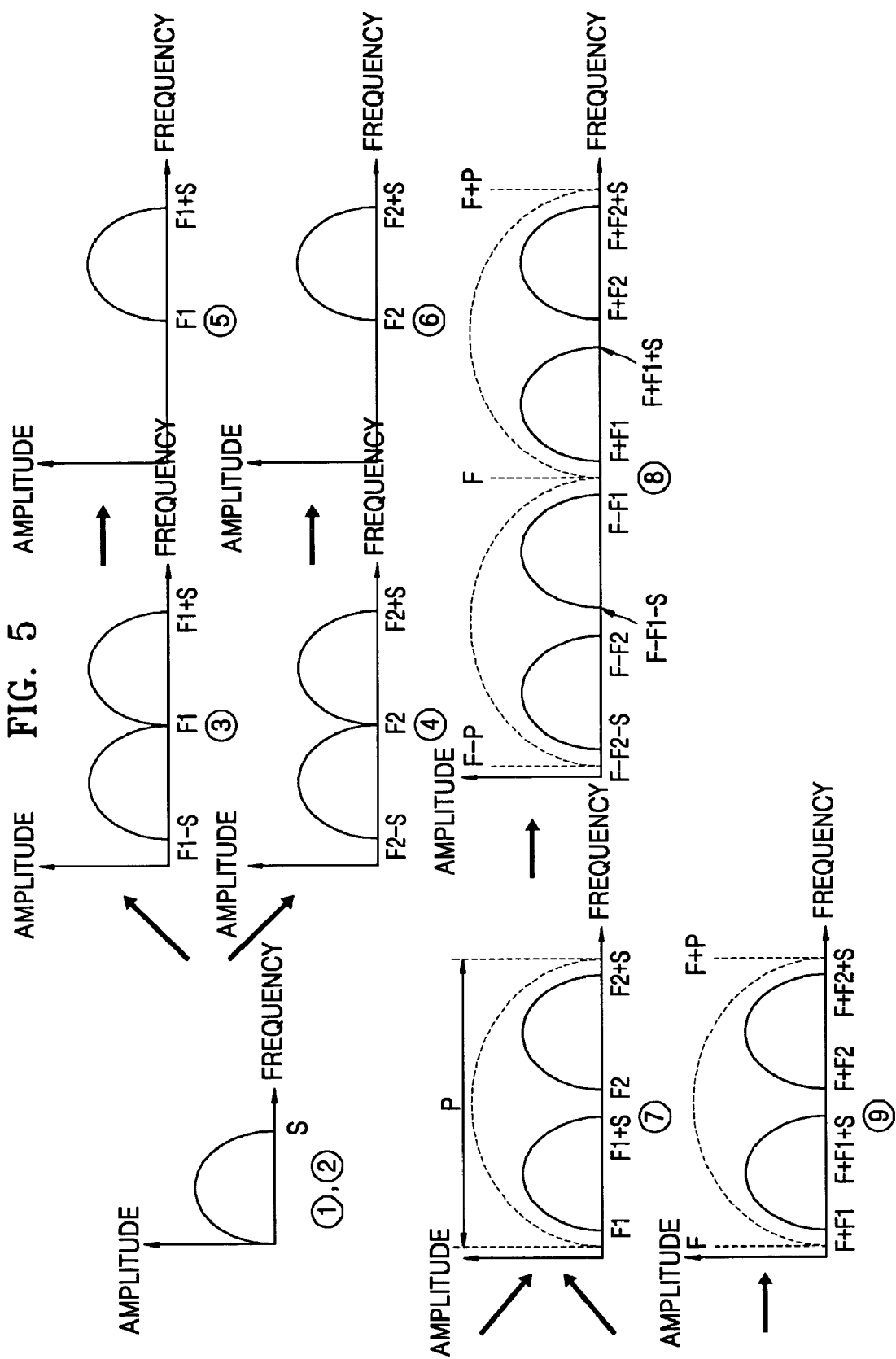
FIG. 5 is a diagram of waveforms of signals input and output inside the apparatus for transmitting multiple signals inclusively of FIG. 4.

FIG. 5 is a diagram of waveforms of signals input and output inside the apparatus for transmitting multiple signals inclusively of FIG. 4.

Referring to FIG. 4, the apparatus for transmitting multiple signals inclusively comprises a single-sideband signal reception unit 21, a sub-modulation unit 22, a sub-band pass filter 23, a single-sideband signal synthesis unit 24, a main modulation unit 25, a main band pass filter 26, and an inclusive single-sideband signal transmission unit 27.

Referring to FIG. 5, multiple signals include two single-sideband signals. Here, length S of the band of a single-sideband is 6 MHz that is the band for one channel according to the ATSC standard, and a length P of an inclusive band is 20 MHz that is the band for one channel according to the IEEE 802.11a/b standard. That is, two digital TV signals are transmitted and received through a wireless LAN channel. In general, a digital TV has a picture in picture (PIP) function simultaneously showing two broadcasting channels, and the present invention considers this PIP function.

Referring to FIG. 4, the single-sideband signal reception unit 21 comprises a first single-sideband signal reception unit 211 and a second single-sideband signal reception unit 212. The first single-sideband signal reception unit 211 receives a first single-sideband signal having a 6 MHz band. The second single-sideband signal reception unit 212 receives a second single-sideband signal having a 6 MHz band. Generally, the first single-sideband signal reception unit 211 and the second single-sideband signal reception unit 212 are formed with a tuner and an intermediate frequency (IF) converter. If a digital TV viewer manipulates the tuner to select a channel, the tuner selectively receives a signal corresponding to the band of the selected channel. The IF converter converts the received high frequency signal down to a frequency that can be processed in the apparatus for transmitting multiple signals inclusively. Referring to FIG. 5, the waveform 1 output from the first single-sideband signal reception unit 211 and the waveform 2 output from the second single-sideband signal reception unit 212 are shown.

Referring to FIG. 4, the sub-modulation unit 22 comprises a first sub-modulation unit 221 and a second sub-modulation unit 222. The first sub-modulation unit 221 modulates the first single-sideband signal received by the first single-sideband signal reception unit 211, with a first sub-carrier frequency between the first sub-carrier frequency and a second sub-carrier frequency that are divided by intervals greater than the bands of the received first single-sideband and second single-sideband, to generate double-sideband signals where the first sub-carrier frequency is the center frequency. The second sub-modulation unit 222 modulates the second single-sideband signal received by the second single-sideband signal reception unit 212, with the second sub-carrier frequency, to generate double-sideband signals where the second sub-carrier frequency is the center frequency. Generally, the first and second sub-modulation units 221 and 222 are formed by mixers. If a mixer mixes a single-sideband signal and a sub-carrier frequency, a double-sideband signal where the carrier frequency is the center frequency is generated. Referring to FIG. 1, the waveform 3 of the double-sideband signal where the first sub-carrier frequency F1 is the center frequency and the waveform 4 of the double-sideband signal where the second sub-carrier frequency F2 is the center frequency are shown. Since each of the bands of the first and second single-sideband signals is 6 MHz, the interval of the sub-carrier frequencies is needed to be equal to or greater than 6 MHz. For example, the first carrier frequency F1 and the second carrier frequency F2 can be set to 7 MHz and 14 MHz, respectively.

Referring to FIG. 4, the sub-band pass filter 23 comprises a first sub-band pass filter 231 and a second sub-band pass filter 232. The first band pass filter 231 allows only any one single-sideband signal of the double-sideband signal generated in the first sub-modulation unit 221, to pass through, to generate single-sideband signals where the first sub-carrier frequency is an edge frequency of the band. The second band pass filter 231 allows only any one single-sideband signal of the double-sideband signal generated in the second sub-modulation unit 222, to pass through, to generate single-sideband signals where the second sub-carrier frequency is an edge frequency of the band. Referring to FIG. 4, the waveform 5 of the single-sideband signal where the first sub-carrier frequency 7 MHz is an edge frequency of a 6 MHz band, and the waveform 6 where the second sub-carrier frequency 14 MHz is an edge frequency of a 6 MHz band are shown.

The single-sideband signal synthesis unit 22 synthesizes the single-sideband signals generated in the sub-band pass filter 23 to generates an inclusive single-sideband signal having a 20 MHz inclusive band including the bands of the first and second single-sideband signals. Referring to FIG. 5, the waveform 7 of an inclusive single-sideband signal having a 20 MHz inclusive band including the bands of the first and second single-sidebands is shown. That is, the first single-sideband signal spreads between 7 MHz and 13 MHz, and the second single-sideband signal spreads between 14 MHz and 20 MHz. Since the length of the band of the inclusive single-sideband signal including these signals is 20 MHz, there is a remaining band of 8 MHz. The remaining band is used for the original wireless LAN communication. Accordingly, while performing wireless LAN communication as before, the apparatus can transmit and receive TV signals.

The main modulation unit 25 modulates the inclusive single-sideband signal generated in the single-sideband signal synthesis unit 24, with a primary carrier frequency F, to generate an inclusive double-sideband signal where the primary carrier frequency F is the center frequency. Referring to FIG. 5, the waveform 8 of the inclusive double-sideband signal where primary carrier frequency F is the center frequency is shown. Here, the primary carrier frequency F is 5 GHz that is a wireless LAN communication frequency complying with the IEEE 802.11a/b standard.

The main band pass filter 26 allows only any one single-sideband signal of the inclusive double-sideband signal generated in the main modulation unit 25, to pass through, to generate an inclusive single-sideband signal where the primary carrier frequency 5 GHz is an edge frequency of the inclusive band. Referring to FIG. 5, the waveform 9 of the inclusive single-sideband signal where the primary carrier frequency 5 GHz is an edge frequency of the inclusive band is shown.

The inclusive single-sideband signal transmission unit 27 transmits the inclusive single-sideband signal generated in the main band pass filter 26. Generally, the inclusive single-sideband signal transmission unit 27 is formed with an amplifier. Since the inclusive single-sideband signal generated in the main band pass filter 26 is weak, it is amplified by using an amplifier and then transmitted.

Figure 6:
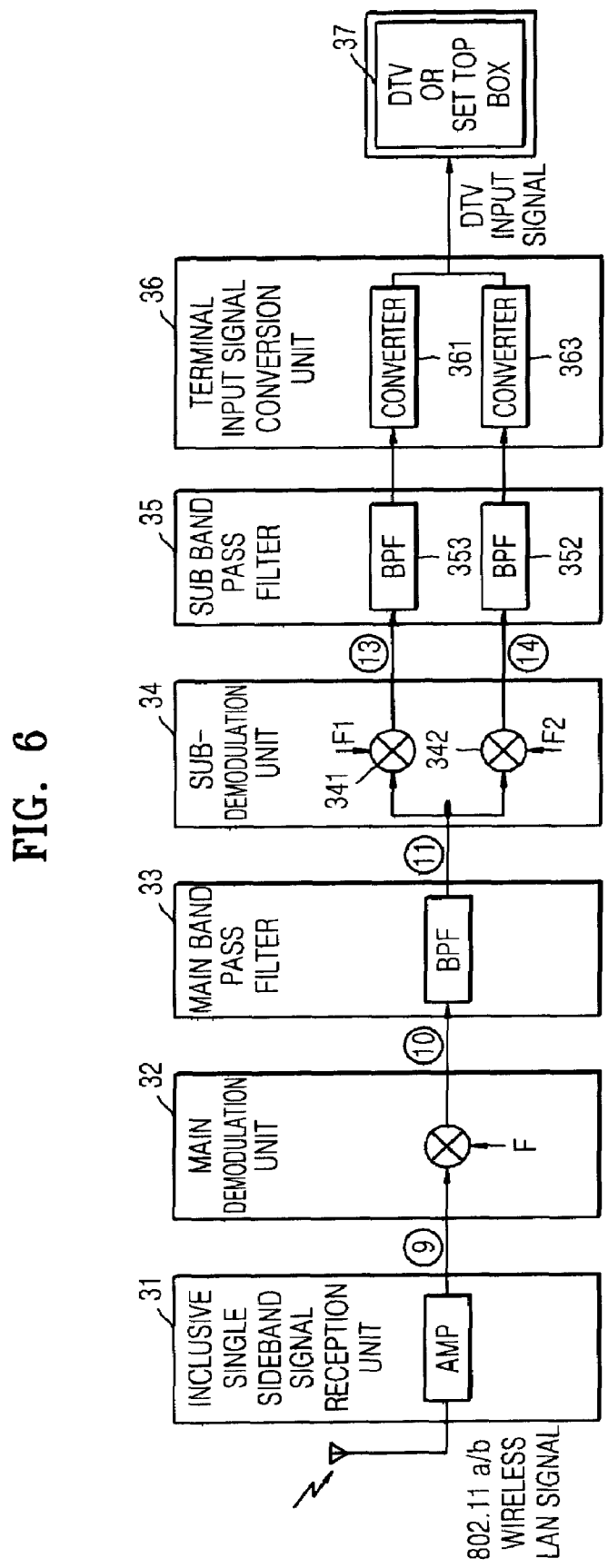
FIG. 6 is a diagram of the apparatus for receiving multiple signals inclusively of FIG. 3 applied to a digital TV standard and wireless LAN standard.

FIG. 6 is a diagram of the apparatus for receiving multiple signals inclusively of FIG. 3 applied to a digital TV standard and wireless LAN standard.

Figure 7:
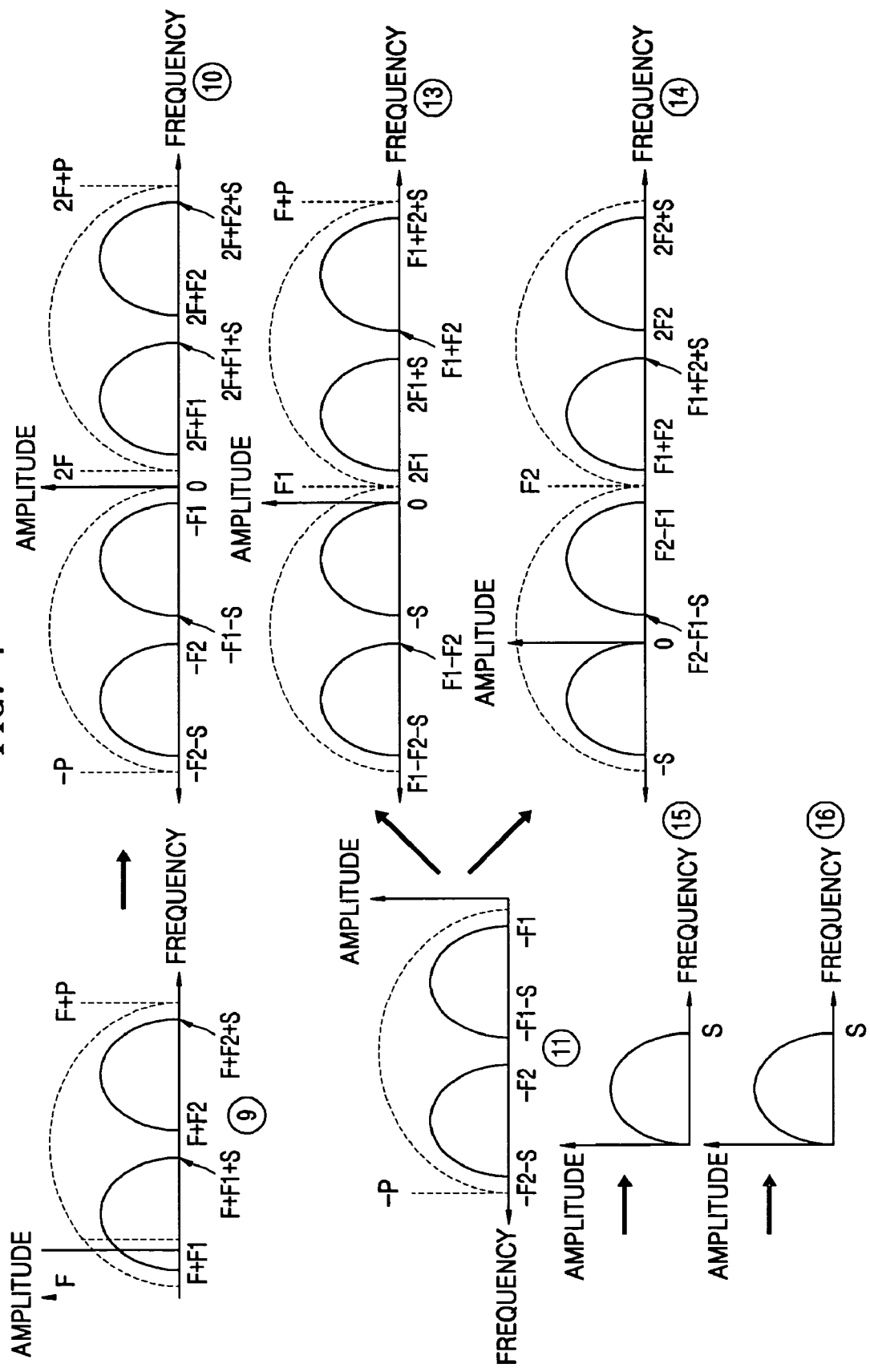
FIG. 7 is a diagram of waveforms of signals input and output inside the apparatus for receiving multiple signals inclusively of FIG. 5.

FIG. 7 is a diagram of waveforms of signals input and output inside the apparatus for receiving multiple signals inclusively of FIG. 5.

Referring to FIG. 6, the apparatus for receiving multiple signals inclusively comprises an inclusive single-sideband signal reception unit 31, a main demodulation unit 32, a main band pass filter 33, a sub-demodulation unit 34, a sub-band pass filter 35, and a terminal input signal conversion unit 36.

The inclusive single-sideband signal reception unit 31 receives an inclusive single-sideband signal having a 20 MHz inclusive band including the bands of single-sideband signals having 6 MHz bands. Generally, the inclusive single-sideband signal reception unit 31 is formed with an amplifier. Since the signal received by an antenna is weak, it is amplified by using an amplifier and then output. Mainly, a low noise amplifier (LNA) is used. Referring to FIG. 7, the waveform 9 of the inclusive single-sideband signal having a 20 MHz inclusive band including the bands of single-sideband signals having 6 MHz bands is shown.

The main demodulation unit 32 modulates the inclusive single-sideband signal received by the inclusive single-sideband signal reception unit 31, with primary carrier frequency 5 GHz that is an edge frequency of the inclusive band, to generate an inclusive double-sideband signal where the primary carrier frequency 5 GHz is the center frequency. Generally, the main demodulation unit 32 is formed with a mixer 32. Referring to FIG. 7, the waveform 10 of the inclusive double-sideband signal where the primary carrier frequency 5 GHz is the center frequency is shown. As shown, the inclusive double-sideband signal 10 includes the inclusive single-sideband signal having a baseband frequency.

The main band pass filter 33 allows only the 20 MHz inclusive band from a first frequency of the inclusive double-sideband signal generated in the main demodulation unit 32, to pass through, to generate an inclusive single-sideband signal where the first frequency is an edge frequency of the 20 MHz inclusive band. Referring to FIG. 7, the waveform 11 of the inclusive single-sideband signal where the first frequency is an edge frequency of the 20 MHz inclusive band is shown. As described above, the first frequency is the start frequency of the baseband and here, it is 0 Hz. That is, the main band pass filter 33 allows only frequencies from 0 Hz to −20 MHz to pass through.

Referring to FIG. 6, the sub-demodulation unit 34 comprises a first sub-demodulation unit 341 and a second sub-demodulation unit 342. The first sub-demodulation unit 341 modulates the inclusive single-sideband signal generated in the main band pass filter 33, with a first sub-carrier frequency, 7 MHz, between the first sub-carrier frequency 7 MHz that is an edge frequency of the band of the first single-sideband signal, and second sub-carrier frequency 14 MHz that is an edge frequency of the band of the second single-sideband signal, to generate a first inclusive double-sideband signal where the first sub-carrier frequency 7 MHz is the center frequency. The second sub-demodulation unit 342 modulates the single-sideband signal generated in the main band pass filter 33, with the second sub-carrier frequency 14 MHz, to generate a second inclusive double-sideband signal where the second sub-carrier frequency 14 MHz is the center frequency. Generally, the first and second demodulation units 341 and 342 are formed with mixers.

Referring to FIG. 7, the waveform 13 of the first inclusive double-sideband signal where the first sub-carrier frequency 7 MHz is the center frequency, and the waveform 14 of the second inclusive double-sideband signal where the second sub-carrier frequency 14 MHz is the center frequency are shown.

Referring to FIG. 6, the sub-band pass filter 35 comprises a first sub-band pass filter 351 and a second sub-band pass filter 352. The first sub-band pass filter 351 allows only the 6 MHz band from a second frequency of the first inclusive double-sideband signal generated in the first sub-demodulation unit 341, to pass through, to generate a first single-sideband signal where the second frequency is an edge frequency of the 6 MHz band. The second sub-band pass filter 352 allows only the 6 MHz band from a second frequency of the second inclusive double-sideband signal generated in the second sub-demodulation unit 342, to pass through to generate a second single-sideband signal where the second frequency is an edge frequency of the 6 MHz band. Referring to FIG. 7, the waveform 15 of the first single-sideband signal where the second frequency is an edge frequency of the band, and the waveform 16 of the second single-sideband signal where the second frequency is an edge frequency of the band are shown. As the first frequency described above, the second frequency is the start frequency of the baseband, and here it is 0 Hz. That is, the first and second band pass filters 351 and 352 allow only frequencies from 0 Hz to −20 MHz to pass through.

Referring to FIG. 6, the terminal input signal conversion unit 36 comprises a first terminal input signal conversion unit 361 and a second terminal input signal conversion unit 362. The first terminal input signal conversion unit 361 converts the first single-sideband signal generated in the first sub-band pass filter 351 into a first input signal for a terminal. The second terminal input signal conversion unit 362 converts the second single-sideband signal generated in the second sub-band pass filter 352 into a second input signal for the terminal. Here, the terminal can be a digital TV or a set-top box. At this time, the first and second terminal input signal conversion units 361 and 362 are formed with radio frequency (RF) converters.

Figure 8:
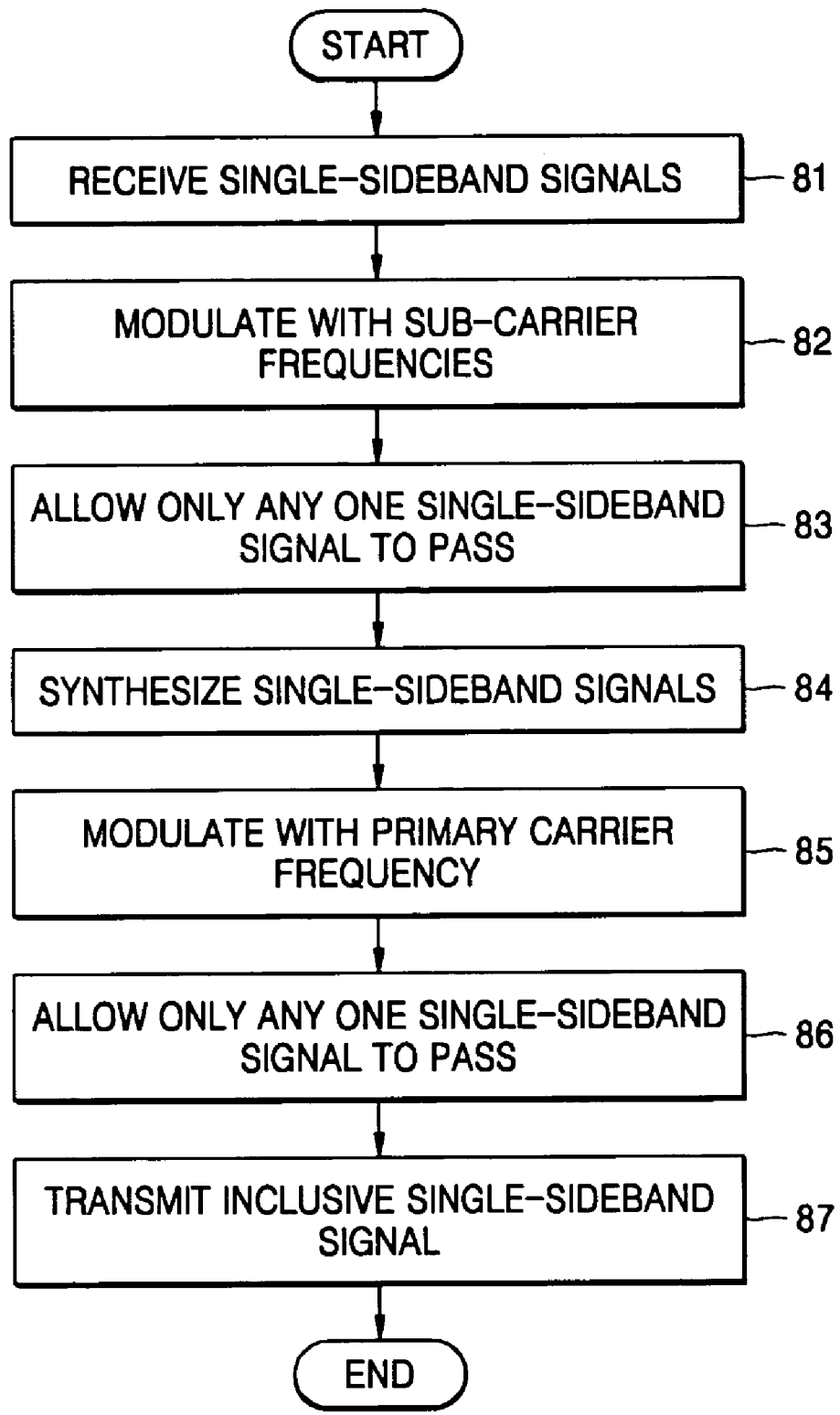
FIG. 8 is a flowchart of the steps performed by a method for transmitting multiple signals inclusively according to an exemplary embodiment of the present invention.

FIG. 8 is a flowchart of the steps performed by a method for transmitting multiple signals inclusively according to an exemplary embodiment of the present invention. Referring to FIG. 8, the method for transmitting multiple signals inclusively will now be explained.

Single-sideband signals having predetermined bands are received in step 81. When the band is 6 MHz that is the band for one channel according to the ATSC standard and an inclusive band is 20 MHz that is the band for one channel according to the IEEE 802.11a/b standard, a first and second single-sideband signals having the 6 MHz bands are received. Then, the received single-sideband signals are modulated with sub-carrier frequencies divided by intervals greater than the bands of the received single-sideband signals, such that double-sideband signals where the sub-carrier frequencies are center frequencies are generated in step 82. When the band is 6 MHz that is the band for one channel according to the ATSC standard and the inclusive band is 20 MHz that is the band for one channel according to the IEEE 802.11a/b standard, the received first single-sideband signal is modulated with a first sub-carrier frequency between the first sub-carrier frequency and a second sub-carrier frequency that are divided by intervals greater than the bands of the received first and second single-sideband signals, and double-sideband signals where the first sub-carrier frequency is the center frequency, and the received second single-sideband signal is modulated with a second sub-carrier frequency and double-sideband signals where the second sub-carrier frequency is the center frequency is generated. Then, any one single-sideband signal of the generated double-sideband signal is allowed to pass through such that single-sideband signals where the sub-carrier frequencies are edge frequencies of the bands are generated in step 83. When the band is 6 MHz that is the band for one channel according to the ATSC standard and the inclusive band is 20 MHz that is the band for one channel according to the IEEE 802.11a/b standard, any one single-sideband signal of the generated double-sideband signal is allowed to pass through such that a single-sideband signal where a first sub-carrier frequency is an edge frequency of the band is generated, and any one single-sideband signal of the generated double-sideband signal is allowed to pass through such that a single-sideband signal where a second sub-carrier frequency is an edge frequency of the band is generated.

Next, by synthesizing the generated single-sideband signals, an inclusive single-sideband signal having an inclusive band including the bands of the single-sideband signals is generated in step 84. Then, the generated inclusive single-sideband signal is modulated with a primary carrier frequency, such that an inclusive double-sideband signal where the primary carrier frequency is the center frequency is generated in step 85. Then, only any one single-sideband signal of the generated inclusive double-sideband signal is allowed to pass through such that an inclusive single-sideband signal where the primary carrier frequency is an edge frequency of the inclusive band is generated in step 86. Then, the generated inclusive single-sideband signal is transmitted in step 87.

Figure 9:
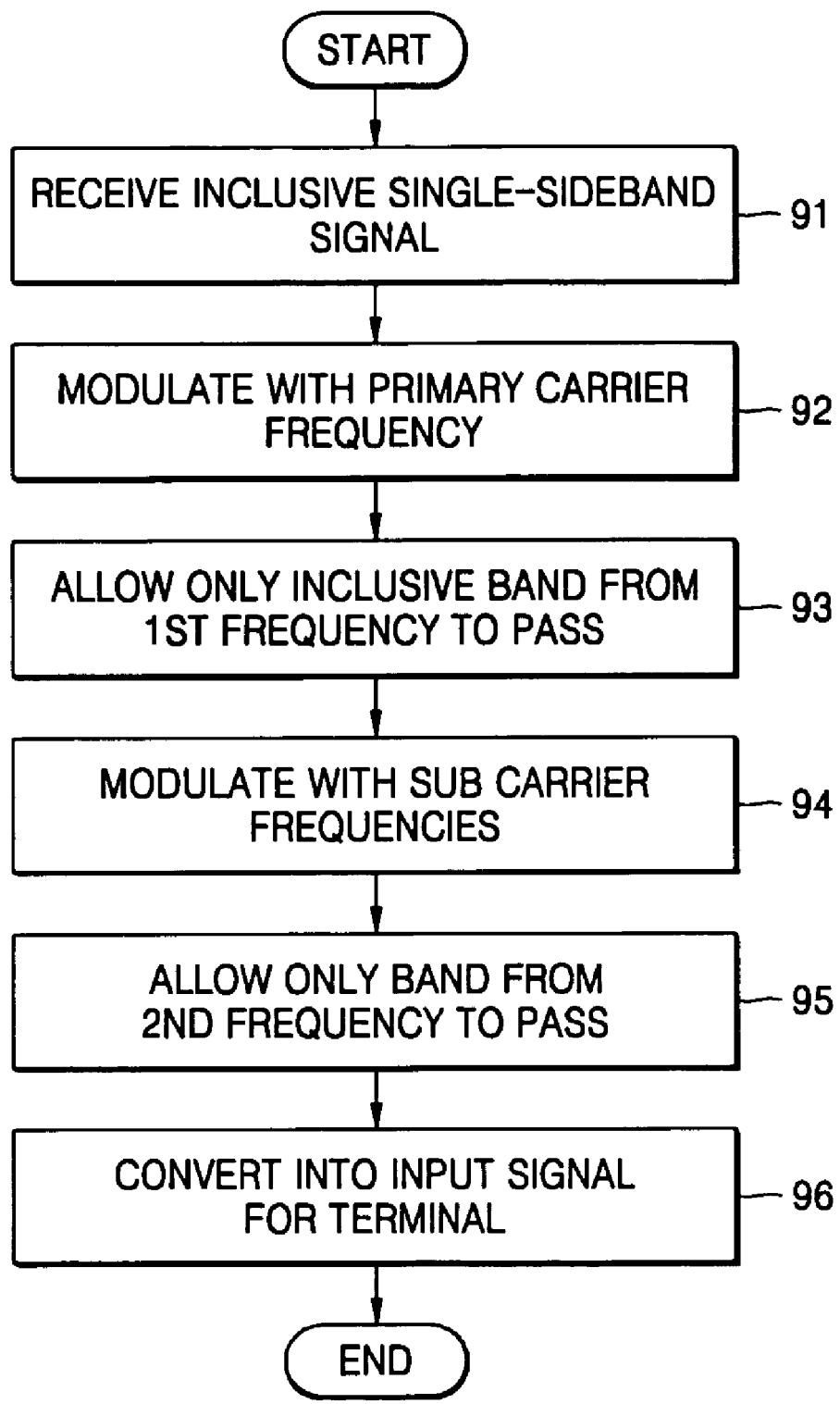
FIG. 9 is a flowchart of the steps performed by a method for receiving multiple signals inclusively according to an exemplary embodiment of the present invention.

FIG. 9 is a flowchart of the steps performed by a method for receiving multiple signals inclusively according to an exemplary embodiment of the present invention. Referring to FIG. 9, the method for receiving multiple signals inclusively will now be explained.

An inclusive single-sideband signal having an inclusive band including the bands of single-sideband signal having predetermined bands is received in step 91. Then, the received inclusive single-sideband signal is modulated with a primary carrier frequency that is an edge frequency of the inclusive band, such that an inclusive double-sideband signal where the primary carrier frequency is the center frequency is generated in step 92. Then, only the inclusive band from a first frequency of the generated inclusive double-sideband signal is allowed to pass through such that an inclusive single-sideband signal where the first frequency is an edge frequency of the inclusive band is generated in step 93.

Next, the generated inclusive single-sideband signal is modulated with sub-carrier frequencies that are edge frequencies of the bands of the single-sideband signals, such that inclusive double-sideband signals where the sub-carrier frequencies are center frequencies are generated in step 94. When the band is 6 MHz that is the band for one channel according to the ATSC standard and the inclusive band is 20 MHz that is the band for one channel according to the IEEE 802.11a/b standard, the generated inclusive single-sideband signal is modulated with a first sub-carrier frequency between the first sub-carrier frequency that is an edge frequency of the band of a first single-sideband signal and a second sub-carrier frequency that is an edge frequency of the band of a second single-sideband signal, such that a first inclusive double-sideband signal where the first sub-carrier frequency is the center frequency is generated. Also, the generated inclusive single-sideband signal is modulated with a second sub-carrier frequency such that a second inclusive double-sideband signal where the second sub-carrier frequency is the center frequency is generated. Then, only the band from a second frequency of the generated inclusive double-sideband signals is allowed to pass through, such that single-sideband signals where the second frequency is an edge frequency of the band are generated in step 95. When the band is 6 MHz that is the band for one channel according to the ATSC standard and the inclusive band is 20 MHz that is the band for one channel according to the IEEE 802.11a/b standard, only the band from the second frequency of the generated first inclusive double-sideband signal is allowed to pass through such that a first single-sideband signal where the second frequency is an edge frequency of the band is generated, and only the band from the second frequency of the generated second inclusive double-sideband signal is allowed to pass through such that a second single-sideband signal where the second frequency is an edge frequency of the band is generated. Then, the generated single-sideband signals are converted into input signals for a predetermined terminal in step 96. When the band is 6 MHz that is the band for one channel according to the ATSC standard and the inclusive band is 20 MHz that is the band for one channel according to the IEEE 802.11a/b standard, the generated first single-sideband signal is converted into a first input signal for the terminal, and the generated second single-sideband signal is converted into a second input signal for the terminal.

Figure 10:
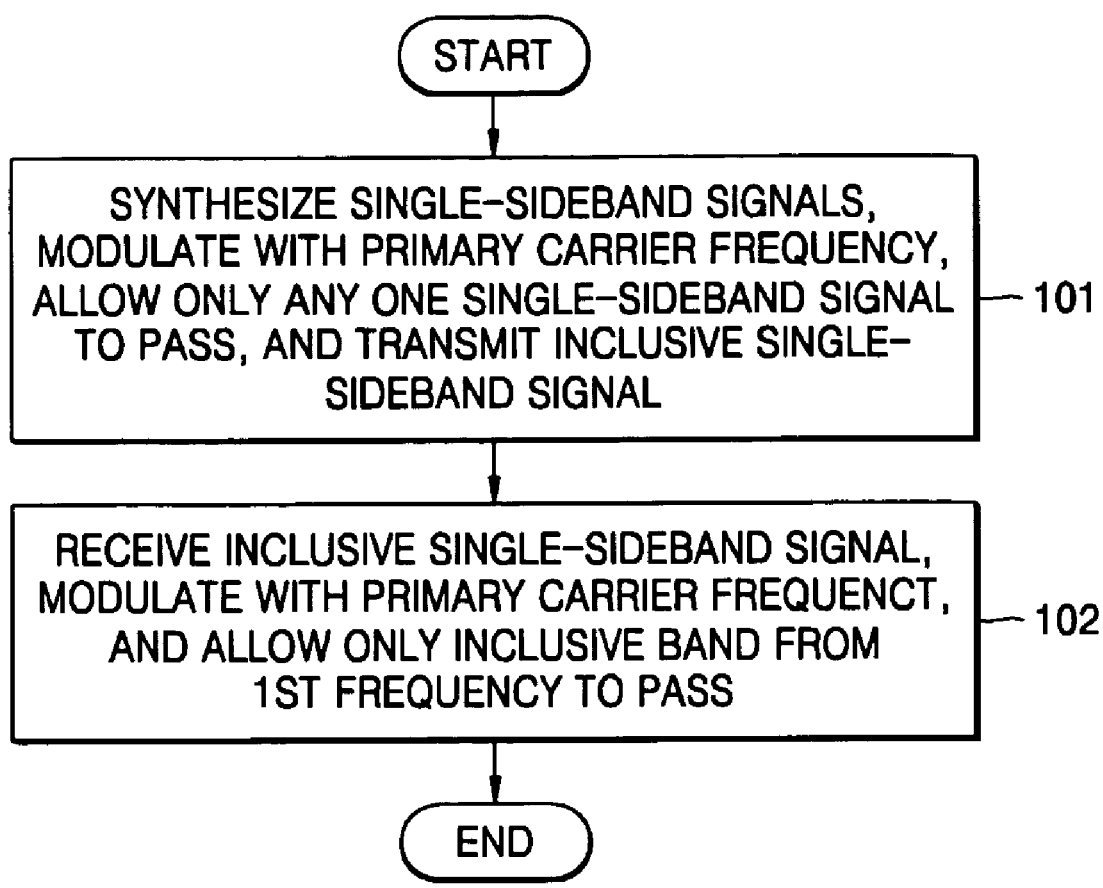
FIG. 10 is a flowchart of the steps performed by a method for transmitting and receiving multiple signals inclusively according to an exemplary embodiment of the present invention.

FIG. 10 is a flowchart of the steps performed by a method for transmitting and receiving multiple signals inclusively according to an exemplary embodiment of the present invention.

In step 101, single-sideband signals having a predetermined band are synthesized such that an inclusive single-sideband signal including the bands of the single-sideband signals are generated; the generated inclusive single-sideband signal are modulated with a primary carrier frequency such that an inclusive double-sideband signal where the primary carrier frequency is the center frequency is generated; only any one single-sideband signal of the generated double-sideband signal is allowed to pass through such that an inclusive single-sideband signal where the primary carrier frequency is an edge frequency of the inclusive band is generated; and the generated inclusive single-sideband signal is transmitted. Then, in step 102, the transmitted inclusive single-sideband signal is received; the received inclusive single-sideband signal is modulated with a primary carrier frequency that is an edge frequency of the inclusive band such that an inclusive double-sideband signal where the primary carrier frequency is the center frequency is generated; only the inclusive band from a first frequency of the generated inclusive double-sideband signal is allowed to pass through such that and an inclusive single-sideband signal where the first frequency is an edge frequency of the inclusive band is generated.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the present invention, multiple signals are included in one channel and transmitted and received such that transmission and reception of multiple signals can be efficiently processed. In particular, by allowing a number of digital TV broadcasting signals to be received by a digital TV through an arbitrary wireless LAN terminal installed in a house, those functions that require a number of digital TV broadcasting signals, such as a PIP function, can be maintained while the digital TV can be moved freely. Accordingly, utilization of the space in the house can be increased. In addition, by installing a wireless LAN terminal, in which an apparatus for receiving multiple signals inclusively is mounted, in an idealistic radio wave reception environment, digital TV broadcasting can be received more efficiently. Furthermore, while digital TV broadcasting programs through the wireless LAN terminal are watched, wireless communications unique to the wireless LAN terminal can be used at the same time.

What is claimed is:

1. An apparatus for transmitting multiple signals inclusively comprising:
a single-sideband signal synthesis unit which synthesizes a plurality of single-sideband signals each having a predetermined band to generate a first inclusive single-sideband signal which includes the predetermined bands of the single-sideband signals;
a main modulation unit which modulates the first inclusive single-sideband signal generated by the single-sideband signal synthesis unit, with a primary carrier frequency to generate an inclusive double-sideband signal with a center frequency which is the primary carrier frequency;
a main band pass filter which allows only one single-sideband signal of the inclusive double-sideband signal generated by the main modulation unit to pass through to generate a second inclusive single-sideband signal having an inclusive band with an edge frequency which is the primary carrier frequency; and
an inclusive single-sideband signal transmission unit which transmits the second inclusive single-sideband signal generated by the main band pass filter.

2. The apparatus of claim 1, further comprising:
a single-sideband signal reception unit which receives single-sideband signals each having the predetermined band;
a sub-modulation unit which modulates the single-sideband signals received by the single-sideband signal reception unit, with sub-carrier frequencies divided by intervals greater than the predetermined band of each of the single-sideband signals received by the single-sideband signal reception unit, to generate double-sideband signals having center frequencies which are the sub-carrier frequencies; and
a sub-band pass filter which allows only one single-sideband signal of each of the double sideband-signal signals generated in the sub-modulation unit to pass through, to generate the single-sideband signals which are synthesized by the single-sideband signal synthesis unit and have bands with edge frequencies which are the sub-carrier frequencies.

3. The apparatus of claim 2, wherein the single-sideband signal reception unit comprises:
a first single-sideband signal reception unit which receives a first single-sideband signal having the predetermined band; and a second single-sideband signal reception unit which receives a second single-sideband signal having the predetermined band, and the sub-modulation unit comprises:

a first sub-modulation unit which modulates the first single-sideband signal received by the first single-sideband signal reception unit, with a first sub-carrier frequency to generate a first double-sideband signal having a center frequency which is the first sub-carrier frequency; and a second modulation unit which modulates the second single-sideband signal received by the second single-sideband signal reception unit, with the second carrier frequency to generate a second double-sideband signal having a center frequency which is the second sub-carrier frequency, and the sub-band pass filter comprises:

a first band pass filter which allows only one single-sideband signal of the first double-sideband signal generated in the first sub-modulation unit, to pass through, to generate a third single-sideband signal having the predetermined band with an edge frequency which is the first sub-carrier frequency; and a second band pass filter which allows only one single-sideband signal of the second double-sideband signal generated in the second sub-modulation unit, to pass through, to generate a fourth single-sideband signal having the predetermined band with an edge frequency which is the second sub-carrier frequency.

4. The apparatus of claim 3, wherein a length of the predetermined band corresponds to a length of a band for one channel according to the Advanced Television System Committee (ATSC) standard, and a length of the inclusive band corresponds to a length of a band for one channel according to the IEEE 802.11a/b standard.

5. An apparatus for receiving multiple signals inclusively comprising:

an inclusive single-sideband signal reception unit which receives a first inclusive single-sideband signal having an inclusive band including bands of single-sideband signals each having a predetermined band;

a main demodulation unit which modulates the first inclusive single-sideband signal received by the inclusive single-sideband signal reception unit, with a primary carrier frequency that is an edge frequency of the inclusive band, to generate a first inclusive double-sideband signal having a center frequency which is the primary carrier frequency; and a main band pass filter which allows only the inclusive band from a first frequency of the inclusive double-sideband signal generated by the main demodulation unit, to pass through, to generate a second inclusive single-sideband signal having the inclusive band with an edge frequency which is the first frequency.

6. The apparatus of claim 5, further comprising:

a sub-demodulation unit which modulates the second inclusive single-sideband signal generated by the main band pass filter, with sub-carrier frequencies that are edge frequencies of the bands of the single-sideband signals, to generate at least second and third inclusive double-sideband signals having center frequencies which are the sub-carrier frequencies;

a sub-band pass filter which allows only one band from a second frequency of each of the second and third inclusive double-sideband signals generated by the sub-demodulation unit, to pass through, to generate single-sideband signals each having an edge frequency which is the second frequency; and a terminal input signal conversion unit which converts the single-sideband signals generated by the sub-band pass filter, into input signals provided to a predetermined terminal.

7. The apparatus of claim 6, wherein the sub-demodulation unit comprises:

a first demodulation unit which modulates the second inclusive single-sideband signal generated by the main band pass filter, with a first sub-carrier to generate the second inclusive double-sideband signal having a center frequency which is the first sub-carrier frequency; and a second demodulation unit which modulates the second single-sideband signal generated by the main band pass filter, with the second sub-carrier frequency, to generate the third inclusive double-sideband signal having a center frequency which is the second sub-carrier frequency, and the sub-band pass filter comprises:

a first sub-band pass filter which allows only the band from the second frequency of the second inclusive double-sideband signal generated by the first sub-demodulation unit, to pass through, to generate a first single-sideband signal having a edge frequency which is the second frequency; and a second sub-band pass filter which allows only the band from the second frequency of the third inclusive double-sideband signal generated by the first demodulation unit, to pass through, to generate a second single-sideband signal having an edge frequency which is the second frequency, and the terminal input signal conversion unit comprises:

a first terminal input signal conversion unit which converts the first single-sideband signal generated by the first sub-band pass filter, into a first input signal for the terminal; and a second terminal input signal conversion unit which converts the second single-sideband signal generated by the second sub-band pass filter, into a second input signal for the terminal.

8. The apparatus of claim 7, wherein a length of the predetermined band corresponds to a length of a band for one channel according to the Advanced Television System Committee (ATSC) standard, and a length of the inclusive band corresponds to a length of a band for one channel according to the IEEE 802.11a/b standard.

9. An apparatus for transmitting and receiving multiple signals inclusively comprising:

an apparatus for transmitting multiple signals inclusively which synthesizes single-sideband signals each having a predetermined band to generate a first inclusive single-sideband signal including the predetermined bands of the single-sideband signals, modulates the first inclusive single-sideband signal with a primary carrier frequency to generate a first inclusive double-sideband signal having a center frequency which is the primary carrier frequency, fillers the first inclusive double-sideband signal to allow only one single-sideband signal of the first inclusive double-sideband signal to pass through, to generate a second inclusive single-sideband signal having an inclusive band with an edge frequency which is the primary carrier frequency, and transmits the second inclusive single-sideband signal; and an apparatus for receiving multiple signals inclusively which receives the second inclusive single-sideband signal transmitted by the apparatus for transmitting multiple signals inclusively, modulates the second inclusive single-sideband signal with a primary carrier frequency that is an edge frequency of the inclusive band of the second inclusive single-sideband signal, to generate a second inclusive double-sideband signal having a center frequency which is the primary carrier frequency, allows only an inclusive band from a first frequency of the second inclusive double-sideband signal to pass through, to generate a third inclusive single-sideband signal having the inclusive band with an edge frequency which is the first frequency.

10. A method for transmitting multiple signals inclusively comprising:
(a) synthesizing single-sideband signals each having a predetermined band to generate a first inclusive single-sideband signal which includes the predetermined bands of the single-sideband signals;
(b) modulating the first inclusive single-sideband signal with a primary carrier frequency to generate a first inclusive double-sideband signal having a center frequency which is the primary carrier frequency;
(c) filtering the inclusive double-sideband signal by allowing only one single-sideband signal of the first inclusive double-sideband signal to pass to generate a second inclusive single-sideband signal having an inclusive band with an edge frequency which is the primary carrier frequency; and
(d) transmitting the second inclusive single-sideband signal.

11. The method of claim 10, further comprising, prior to steps (a)-(d):
(e) receiving single-sideband signals each having the predetermined band;
(f) modulating the received single-sideband signals with sub-carrier frequencies divided by intervals greater than the predetermined bands of the received single-sideband signals, to generate double-sideband signals having center frequencies which are the sub-carrier frequencies; and
(g) filtering the double-sideband signals by allowing only one single-sideband signal of each of the double sideband-signals to pass through, to generate single-sideband signals which are have edge frequencies which are the sub-carrier frequencies,
wherein step (a) comprises synthesizing the single-sideband signals generated in step (g).

12. The method of claim 11, wherein step (e) comprises:
(e1) receiving a first single-sideband signal having the predetermined band; and
(e2) receiving a second single-sideband signal having the predetermined band, and step (f) comprises:
(f1) modulating the first single-sideband signal with a first sub-carrier to generate a first double-sideband signal having a center frequency which is the first sub-carrier frequency; and
(f2) modulating the received second single-sideband signal with the second carrier frequency to generate a second double-sideband signal having a center frequency which is the second sub-carrier frequency, and step (g) comprises:
(g1) allowing only one single-sideband signal of the first double-sideband signal to pass through to generate a third single-sideband signal having the predetermined band with an edge frequency which is the first sub-carrier frequency; and
(g2) allowing only one single-sideband signal of the second double-sideband signal to pass through to generate a fourth single-sideband signal having the predetermined band with an edge frequency which is the second sub-carrier frequency.

13. The method of claim 12, wherein a length of the predetermined band corresponds to a length of a band for one channel according to the Advanced Television System Committee (ATSC) standard, and a length of the inclusive band corresponds to a length of a band for one channel according to the IEEE 802.11a/b standard.

14. A method for receiving multiple signals inclusively comprising:
(a) receiving a first inclusive single-sideband signal having an inclusive band including bands of single-sideband signals each having a predetermined band;
(b) modulating the first inclusive single-sideband signal with a primary carrier frequency that is an edge frequency of the inclusive band, to generate a first inclusive double-sideband signal having a center frequency which is the primary carrier frequency; and
(c) allowing only the inclusive band from a first frequency of the first inclusive double-sideband signal to pass through, to generate a second inclusive single-sideband signal having an edge frequency which is the first frequency.

15. The method of claim 14, further comprising:
(d) modulating the second inclusive single-sideband signal with sub-carrier frequencies that are edge frequencies of the bands of the single-sideband signals, to generate at least second and third inclusive double-sideband signals having center frequency which are the sub-carrier frequencies;
(e) allowing only a band from a second frequency of each of the second and third inclusive double-sideband signals to pass through, to generate single-sideband signals having an edge frequency which is the second frequency; and
(f) converting the single-sideband signals generated in step (e) into input signals provided to a predetermined terminal.

16. The method of claim 15, wherein step (d) comprises:
(d1) modulating the second inclusive single-sideband signal with a first sub-carrier frequency to generate the second inclusive double-sideband signal having a center frequency which is the first sub-carrier frequency; and
(d2) modulating the generated single-sideband signal with the second sub-carrier frequency, to generate the third inclusive double-sideband signal having a center frequency which is the second sub-carrier frequency, and step (e) comprises:
(e1) allowing only the band from the second frequency of the second inclusive double-sideband signal to pass through, to generate a first single-sideband signal having an edge frequency which is the second frequency; and
(e2) allowing only the band from the second frequency of the third inclusive double-sideband signal to pass through, to generate a second single-sideband signal having an edge frequency which is the second frequency, and step (f) comprises:
(f1) converting the first single-sideband signal into a first input signal for the terminal; and
(f2) converting the second single-sideband signal into a second input signal for the terminal.

17. The method of claim 16, wherein a length of the predetermined band corresponds to a length of a band for one channel according to the Advanced Television System Committee (ATSC) standard, and a length of the inclusive band corresponds to a length of a band for one channel according to the IEEE 802.11a/b standard.

18. A method for transmitting and receiving multiple signals inclusively comprising:
synthesizing single-sideband signals each having a predetermined band, to generate a first inclusive single-sideband signal including the predetermined bands of the single-sideband signals;
modulating the first inclusive single-sideband signal with a primary carrier frequency, to generate a first inclusive double-sideband signal having a center frequency which is the primary carrier frequency;
filtering the first inclusive double-sideband signal by allowing only one single-sideband signal of the first inclusive double-sideband signal to pass through, to generate an second inclusive single-sideband signal having an inclusive band with an edge frequency which is the primary carrier frequency;
transmitting the second inclusive single-sideband signal;
receiving the second inclusive single-sideband signal;
modulating the second inclusive single-sideband signal with a primary carrier frequency that is an edge frequency of the inclusive band, to generate an second inclusive double-sideband signal having a center frequency which is the primary carrier frequency; and
filtering the second double-sideband signal by allowing only the inclusive band from a first frequency of the second inclusive double-sideband signal to pass through, to generate a third inclusive single-sideband signal having the inclusive band with an edge frequency which is the first frequency.

19. A tangible computer readable recording medium having embodied thereon a program for executing a method for transmitting multiple signals inclusively, wherein the method comprises:
synthesizing single-sideband signals each having a predetermined band to generate a first inclusive single-sideband signal which includes the predetermined bands of the single-sideband signals;
modulating the first inclusive single-sideband signal with a primary carrier frequency to generate an inclusive double-sideband signal having a center frequency which is the primary carrier frequency;
filtering the inclusive double-sideband signal by allowing only one single-sideband signal of the inclusive double-sideband signal to pass through, to generate a second inclusive single-sideband signal having an inclusive band with an edge frequency which is the primary carrier frequency; and
transmitting the second inclusive single-sideband signal.

20. A tangible computer readable recording medium having embodied thereon a program for executing a method for receiving multiple signals inclusively, wherein the method comprises:
receiving a first inclusive single-sideband signal having an inclusive band including bands of single-sideband signals each having a predetermined band;
modulating the first inclusive single-sideband signal with a primary carrier frequency that is an edge frequency of the inclusive band, to generate an inclusive double-sideband signal having a center frequency which is the primary carrier frequency; and
filtering the inclusive double-sideband signal by allowing only the inclusive band from a first frequency of the inclusive double-sideband signal to pass through, to generate a second inclusive single-sideband signal having the inclusive band with an edge frequency which the first frequency.

21. A tangible computer readable recording medium having embodied thereon a program for executing a method for transmitting and receiving multiple signals inclusively, wherein the method comprises:
synthesizing single-sideband signals each having a predetermined band, to generate a first inclusive single-sideband signal including the predetermined bands of the single-sideband signals;
modulating the first inclusive single-sideband signal with a primary carrier frequency, to generate a first inclusive double-sideband signal having a center frequency which is the primary carrier frequency;
filtering the first inclusive double-sideband signal by allowing only one single-sideband signal of the first double-sideband signal to pass through, to generate a second inclusive single-sideband signal having an inclusive band with an edge frequency which is the primary carrier frequency;
transmitting the second inclusive single-sideband signal;
receiving the second single-sideband signal;
modulating the second inclusive single-sideband signal with a primary carrier frequency that is an edge frequency of the inclusive band, to generate a second inclusive double-sideband signal having a center frequency which is the primary carrier frequency; and
filtering the second double-sideband signal by allowing only the inclusive band from a first frequency of the second inclusive double-sideband signal to pass through, to generate a third inclusive single-sideband signal having the inclusive band with an edge frequency which is the first frequency.

* * * * *